US008499453B2

(12) United States Patent
Mihara et al.

(10) Patent No.: US 8,499,453 B2
(45) Date of Patent: Aug. 6, 2013

(54) METHOD OF MANUFACTURING LIQUID DISCHARGE HEAD, AND METHOD OF MANUFACTURING DISCHARGE PORT MEMBER

(75) Inventors: Hiroaki Mihara, Machida (JP); Ken Ikegame, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 349 days.

(21) Appl. No.: 12/914,564

(22) Filed: Oct. 28, 2010

(65) Prior Publication Data

US 2011/0120627 A1 May 26, 2011

(30) Foreign Application Priority Data

Nov. 26, 2009 (JP) ................................ 2009-268758

(51) Int. Cl.
*B21D 53/76* (2006.01)
*B23P 17/00* (2006.01)
*B41J 2/015* (2006.01)

(52) U.S. Cl.
USPC ............................................ 29/890.1; 347/20

(58) Field of Classification Search
USPC .......... 29/890.1; 347/20, 40, 44, 45; 427/123; 430/270.1
See application file for complete search history.

(56) References Cited

U.S. PATENT DOCUMENTS

| | | | | |
|---|---|---|---|---|
| 4,972,204 | A * | 11/1990 | Sexton | 347/47 |
| 6,074,543 | A * | 6/2000 | Yoshihira et al. | 205/75 |
| 6,223,405 | B1 * | 5/2001 | Oikawa et al. | 29/25.35 |
| 6,341,836 | B1 * | 1/2002 | Koike et al. | 347/20 |
| 6,360,439 | B1 * | 3/2002 | Cleland et al. | 29/890.1 |
| 6,378,205 | B1 * | 4/2002 | Yoshihira et al. | 29/890.1 |
| 6,402,921 | B1 * | 6/2002 | Ahn et al. | 205/70 |
| 6,449,831 | B1 * | 9/2002 | Komplin et al. | 29/611 |
| 6,527,377 | B1 * | 3/2003 | Ikegame et al. | 347/56 |
| 6,569,343 | B1 * | 5/2003 | Suzuki et al. | 216/27 |
| 7,086,154 | B2 * | 8/2006 | Ito et al. | 29/890.1 |
| 7,416,675 | B2 * | 8/2008 | Shim et al. | 216/27 |

(Continued)

FOREIGN PATENT DOCUMENTS

| | | |
|---|---|---|
| CN | 1968815 A | 5/2007 |
| CN | 101541540 A | 9/2009 |

(Continued)

OTHER PUBLICATIONS

Notification of the First Office Action dated Jan. 16, 2013, in Chinese Application No. 201010556525.5.

*Primary Examiner* — David Angwin
(74) *Attorney, Agent, or Firm* — Fitzpatrick, Cella, Harper & Scinto

(57) ABSTRACT

There is provided a method of manufacturing a liquid discharge head having a substrate including energy generating elements, and a discharge port member, which is provided with discharge ports and is joined to the substrate, thereby forming liquid flow paths communicating with the discharge ports. The method includes, in the following order, preparing a conductive base on which a first insulating resist and a second insulating resist for forming the discharge ports are stacked in this order; performing plating using the first resist and the second resist as masks, and forming a first plated layer; removing the second resist; performing plating on the base using the first resist as a mask, thereby forming a second plated layer so as to cover the first plated layer; removing the base and the first resist, thereby forming the discharge port member; and joining together the substrate and the discharge port member.

10 Claims, 8 Drawing Sheets

U.S. PATENT DOCUMENTS 8,141,983 B2 * 3/2012 Fujii ..... 347/47
8,227,043 B2 * 7/2012 Kubota et al. ..... 427/407.1
2002/0036675 A1 * 3/2002 Yoshihira et al. ..... 347/56
2003/0143492 A1 * 7/2003 Sexton ..... 430/320
2003/0215743 A1 * 11/2003 Goto ..... 430/271.1
2004/0072107 A1 * 4/2004 Kubota et al. ..... 430/320
2004/0105996 A1 * 6/2004 Takagi et al. ..... 428/606
2004/0131957 A1 * 7/2004 Kubota et al. ..... 430/15
2004/0174411 A1 * 9/2004 Sumiya et al. ..... 347/47
2004/0214945 A1 * 10/2004 Uozumi ..... 524/551
2005/0082943 A1 * 4/2005 Kubota et al. ..... 310/311
2005/0181309 A1 * 8/2005 Miyagawa et al. ..... 430/311
2005/0248623 A1 * 11/2005 Komuro et al. ..... 347/58
2006/0098051 A1 * 5/2006 Kubota et al. ..... 347/61
2006/0114295 A1 * 6/2006 Asai et al. ..... 347/65
2006/0125877 A1 * 6/2006 Kubota et al. ..... 347/47
2006/0125884 A1 * 6/2006 Sato et al. ..... 347/65
2006/0127813 A1 * 6/2006 Ohkuma et al. ..... 430/311
2006/0127814 A1 * 6/2006 Sexton ..... 430/311
2006/0132539 A1 * 6/2006 Hino et al. ..... 347/47
2007/0085877 A1 * 4/2007 Ohkuma et al. ..... 347/45
2007/0126772 A1 * 6/2007 Shim et al. ..... 347/20

FOREIGN PATENT DOCUMENTS

JP 03-049960 A 3/1991
JP 8-132625 A 5/1996
JP 10-16236 A 1/1998
JP 10-264400 A 10/1998
JP 2001-38915 A 2/2001
JP 2002-59551 A 2/2002

* cited by examiner

METHOD OF MANUFACTURING LIQUID DISCHARGE HEAD, AND METHOD OF MANUFACTURING DISCHARGE PORT MEMBER

BACKGROUND OF THE INVENTION

1. Field of the Present Invention

The present invention relates to a method of manufacturing a liquid discharge head having discharge ports which discharge a liquid, and a method of manufacturing a discharge port member for the liquid discharge head.

2. Description of the Related Art

A liquid discharge head can be used as an ink jet head mounted on an ink jet printer. Japanese Patent Application Laid-Open No. H03-049960 discloses a method of forming a discharge port member, having discharge ports which discharge ink and being used for an ink jet printer, by electroforming.

A method of forming a discharge port member using electroforming will be described in detail. FIG. 11 is an enlarged sectional view of portions of discharge ports and liquid flow paths in the liquid discharge head 1. A discharge port member 11 is provided with a plurality of discharge ports 12, and the discharge port member 11 is fixed to flow path walls 13 with an adhesive 16. The flow path walls 13 are arranged on the element substrate 10 having energy generating elements 14 which generate the energy for discharging ink. Liquid chambers which are regions surrounded by the flow path walls 13, the element substrate 10, and the discharge port member 11 are filled with ink. The ink within a liquid chamber is caused to fly as ink droplets from a discharge port 12 of the discharge port member 11 by the energy generated by the energy generating element 14, and adheres on a printing paper.

There are a number of methods as the method of forming the discharge ports 12 in the discharge port member 11. For example, drilling, electrical discharge machining, laser machining, electroforming, and the like are generally known. Among these methods, electroforming has an advantage that a plurality of discharge ports 12 can be formed at a low cost.

FIGS. 4A to 4C are views for describing an example in which discharge ports 12 are formed by electroforming. First, as illustrated in FIG. 4A, a resist 17 made of photosensitive resin is coated on the conductive substrate 21. Next, a mask 18 having openings is arranged on the resist 17. In addition, in the mask 18, the distance between an opening and another opening adjacent thereto (an arrow portion in FIG. 4A) is D. Then, portions of the resist 17 corresponding to the openings are exposed using exposure light 19. When the portions are subjected to development treatment, the resist 17 is developed as illustrated in FIG. 4B. In addition, the thickness of resist 17 is defined as tD. Next, when Ni (nickel) is plated on the conductive substrate 21 by electroforming, as illustrated in FIG. 4C, plated nickel 20 is stacked. At this time, a discharge port with diameter d is formed between the stacks of plated nickel 20. When the thickness (refer to FIG. 4C) of the plated nickel 20 is defined as tN, the diameter d is substantially expressed by the following expression.

$$d \cong D-2(tN-tD) \qquad \text{(Expression 1)}$$

Accordingly, d is determined by the distance D between an opening and another opening adjacent thereto in the mask, the thickness tD of the resist 17, and the thickness tN of the plated nickel 20. Since tD is negligible, in the case when d is not to be changed, the thickness of the plated layer must become smaller when the distance between the discharge ports is made smaller. In other words, the discharge port member becomes thinner as the density of the discharge ports becomes higher.

Here, a flow path, which leads to a discharge port 12 of the discharge port member formed by plating, is formed by a curved surface so that the diameter thereof becomes gradually smaller toward the discharge port 12. When the discharge port member is formed in a shape such that the thickness of the member becomes smaller, it becomes difficult to make a discharge liquid droplet fly in a direction in which the liquid droplet goes straight ahead toward the substrate 101.

SUMMARY OF THE INVENTION

Thus, the object of the present invention is to provide a method of efficiently manufacturing a discharge port forming member having a high discharge performance, using electroforming.

A method of manufacturing a liquid discharge head having a substrate including energy generating elements which generate the energy used to discharge a liquid, and a discharge port member which is provided with discharge ports which discharge the liquid and is joined to the substrate, thereby forming liquid flow paths communicating with the discharge ports, includes in this order: preparing a conductive base on which a first insulating resist and a second insulating resist for forming the discharge ports are stacked in this order; performing plating using the first resist and the second resist as masks, and forming a first plated layer so that the height of the top surface of the first plated layer from the base is higher than the height of the top surface of the first resist from the base and is lower than the height of the top surface of the second resist from the base; removing the second resist; performing plating on the base using the first resist as a mask, thereby forming a second plated layer so as to cover the first plated layer; removing the base and the first resist, thereby forming the discharge port member; and joining together the substrate and the discharge port member.

According to the present invention, a discharge port forming member having a high discharge performance can be efficiently manufactured using electroforming.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present invention relates to a method of manufacturing a discharge port forming member for a liquid discharge head which has discharge ports which discharge a liquid. Additionally, a discharge port forming member is formed by performing at least two plating treatments, using electroforming.

A process for manufacturing a discharge port forming member related to the present invention will be described with reference to FIGS. 5A to 5F.

Figure 5A:
FIGS. 5A 5B, 5C, 5D, 5E and 5F are process sectional views for describing a method of manufacturing a discharge port forming member of the present invention.
Figure 5B:
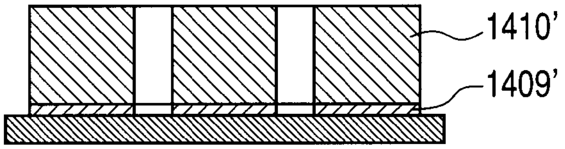

First, as illustrated in FIG. 5A, a conductive substrate (base) 1408 is prepared. Then, as illustrated in FIG. 5B, a structure including a first resist layer 1409' and a second resist layer 1410' on the first resist layer which become a molding material which forms tip portions of discharge ports is formed at the formation positions of the discharge ports on the conductive substrate. That is, a structure including the first resist layer 1409' and the second resist layer 1410' is formed on the conductive substrate at positions where discharge ports are to be formed.

The thickness of the first resist layer 1409' can be set to, for example, 0.01 to 10 μm, is preferably set to 0.01 to 3 μm, and is more preferably set to 0.1 to 2 μm.

The thickness of the second resist layer 1410' can be set to, for example, 1 to 1000 μm, is preferably set to 5 to 200 μm, and is more preferably set to 10 to 100 μm.

As the material of the conductive substrate, any materials having conductivity can be used. For example, a metal substrate, or substrates in which a conductive layer is formed on materials, such as resin, ceramics, and glass can be used. The conductive layer is formed by thin film forming methods, such as a sputtering method, a vapor deposition method, plating, and an ion plating method, using conductive metals, such as copper, nickel, chromium, and iron, as materials.

Figure 5C:
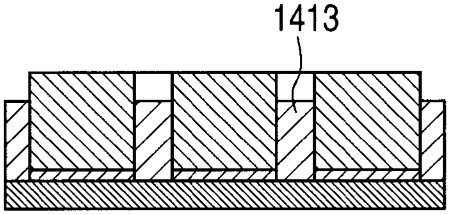

Next, as illustrated in FIG. 5C, a first plated layer 1413 is formed on an exposed conductive surface of the conductive substrate using electroforming so that the height is above the top surface of the first resist layer, and is below the top surface of the second resist layer. That is, the first plated layer 1413 is formed on the exposed surface of the conductive substrate 1408 by performing a first plating treatment. At this time, the first plated layer is formed so that the height thereof is above the top surface of the first resist layer, and is below the top surface of the second resist layer.

The height of the first plated layer 1413 can be set to, for example, 2 to 500 μm, and is preferably set to 5 to 80 μm. By setting the first plated layer in this range, the straight-ahead property of droplets can be further improved.

The plating treatment is performed using electroforming. A method of immersing the conductive substrate in plating baths, such as a nickel sulfamate bath, and applying an electric current to the conductive substrate, thereby electrocrystallizing nickel or the like can be exemplified as the electroforming.

Figure 5D:
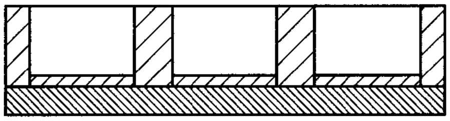

Next, as illustrated in FIG. 5D, the second resist layer is removed.

Figure 5E:
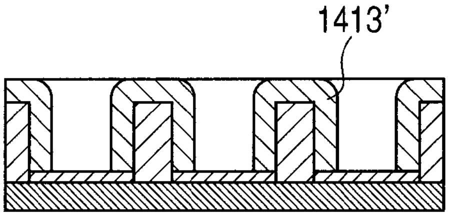

Next, as illustrated in FIG. 5E, a second plated layer 1413' is formed around the first plated layer 1413 using electroforming, and discharge ports are formed. That is, a second plating treatment is performed to form the second plated layer 1413', form discharge ports, and form a discharge port forming member.

Although materials different from the above-described materials of the first plated layer can be used as the materials of the second plated layer, the second plated layer and the first plated layer are preferably formed from the same material from a viewpoint of close contact between the second plated layer and the first plated layer. The same material can be used.

Figure 5F:
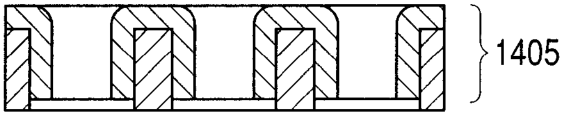

As illustrated in FIG. 5F, since the discharge port forming member formed by the present invention does not have an edge, and the sectional shape of the discharge ports has a straight portion, the straight-ahead property of droplets can be improved. Additionally, even if the density of the nozzles is an extremely high density, the required thickness of a discharge port forming member can be guaranteed. Accordingly, a discharge port forming member having excellent discharge performance can be manufactured using electroforming by the present invention. Additionally, the present invention can manufacture a discharge port forming member having high-density discharge ports, using electroforming.

Hereinafter, embodiments of the present invention will be described with reference to the drawings. Additionally, although the following description will be made taking an ink jet recording head as an example of application of the present invention, the range of application of the present invention is not limited thereto, and can also be applied to the fabrication of biochips or the manufacture of a liquid discharge head for electronic circuit printing. The liquid discharge head also includes, for example, a head for manufacture of color filters, besides the ink jet recording head.

Embodiment 1

Hereinafter, Embodiment 1 of the present invention will be described with reference to the drawings.

Figure 1:
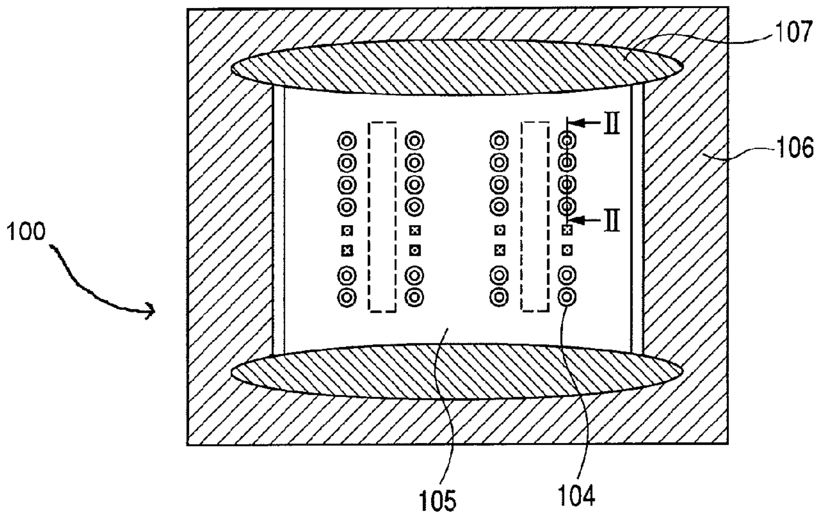
FIG. 1 is a schematic view illustrating the periphery of a discharge port forming member in a liquid discharge head.

FIG. 1 is a schematic view illustrating the periphery of a discharge port forming member for a liquid discharge head manufactured in the present embodiment. Additionally, FIG. 2 is a schematic sectional view in a line II-II of FIG. 1.

Figure 2:
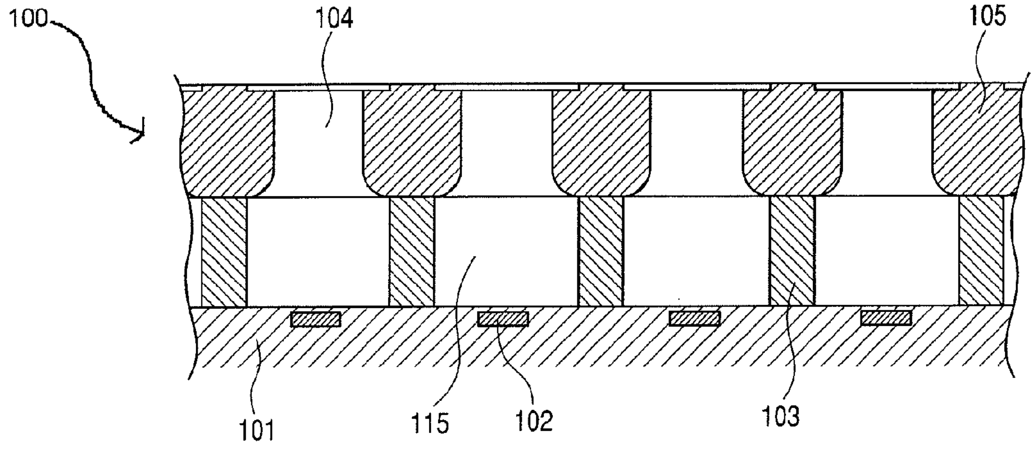
FIG. 2 is a sectional schematic view in a line II-II of FIG. 1.

In FIG. 2, a liquid discharge head 100 has an element substrate 101, and flow path walls 103 which constitute flow paths 115 which communicate with discharge ports 104. Additionally, the element substrate 101 includes a plurality of energy generating elements (for example, heater elements) 102 which generate the energy for discharging ink. Additionally, the energy generating elements 102 are located below the flow paths 115. Additionally, the flow path walls 103 are formed on the element substrate 101 by a photolithography process. Additionally, a discharge port forming member 105 is formed with the discharge ports 104 which discharge ink, and the discharge port forming member 105 is bonded onto the top of the flow path walls 103.

In FIG. 1, the element substrate 101 has an electrode portion (not illustrated), and is electrically connected to an electric wiring tape 106. Additionally, an electrical connecting portion between the element substrate 101 and the electric wiring tape 106 is coated with a lead sealing agent 107 which protects the electrical connecting portion from ink.

Although the material of the element substrate 101 is not particularly limited, Si can be exemplified. Additionally, the thickness of the element substrate can be set to, for example, 0.2 to 1 mm.

As the material of the flow path walls 103, for example, photosensitive resin, which is a material which can be patterned by light, can be used. Additionally, the material of the flow path walls preferably has epoxy resin as a material which can withstand a solvent contained in liquid, such as ink.

Additionally, adhesives can be used for the joining between the flow path wall 103 and the discharge port forming member 105. Additionally, after the flow path walls 103 are optically patterned, without using adhesives, the flow path walls 103 and the discharge port forming member 105 can be connected together, and joined together through heating.

Although the material of the lead sealing agent 107 is preferably epoxy resin or acrylate resin which is cured by heat or light, the material is not limited thereto and can be appropriately selected.

In the present embodiment, for example, the pitch between nozzles can be set to 1200 dpi, and the hole diameter d' of the discharge ports can be set to 10 μm.

Process views for fabricating the discharge port forming member 105 are illustrated in FIGS. 3A to 3G.

Figure 3A:
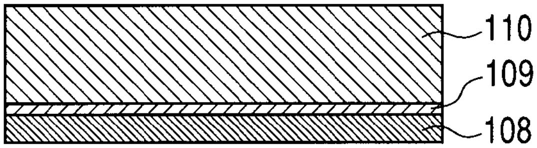
FIGS. 3A, 3B, 3C, 3D, 3E, 3F and 3G are process sectional views for describing a process for manufacturing a discharge port forming member of the present embodiment.

First, as illustrated in FIG. 3A, a first resist material 109 and a second resist material 110 are stacked on a conductive substrate 108. In addition, in the following, the first resist material is also referred to as a lower layer resist material, and the second resist material is also referred to as an upper layer resist material.

Although a negative or positive resist material can be used as the second resist material, a positive resist is desirable when ease of removal is taken into consideration. As the positive resist, for example, methacrylic ester resin, such as polymethylmethacrylate (PMMA), which is a solvent-developed type resist and has a peak near a sensitive wavelength region of 250 nm; polymethylisopropenylketone resin which is a solvent-developed type resist and has a peak near a sensitive wavelength region of 290 nm; or diazonaphthoquinone resin which is an alkali-developed type resist, or the like can be used.

As the first resist material, resist materials different from the second resist material can be used.

Diezonaphthoquinone resin and PMMA resin; PMMA resin and polymethylisopropenyl ketone resin; and polymethylisopropenyl ketone resin and PMMA resin, or the like can be exemplified as combinations of the second resist material and the first resist material. In a case where diezonaphthoquinone resin is used as the first resist material, since a solvent developer which is a developer of the second resist material dissolves diezonaphthoquinone resin, diezonaphthoquinone resin is used only as the second resist material.

In the present embodiment, for example, the thickness of the lower layer resist material 109 can be set to 1 μm, and the thickness of the upper layer resist material 110 can be set to 12 μm.

Figure 3B:
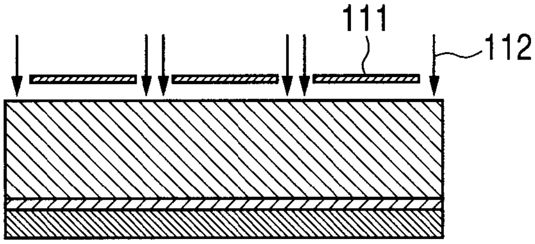

Next, as illustrated in FIG. 3B, predetermined positions of lower layer resist material and the upper layer resist material are collectively irradiated with exposure light 112, using a mask 111.

Figure 3C:
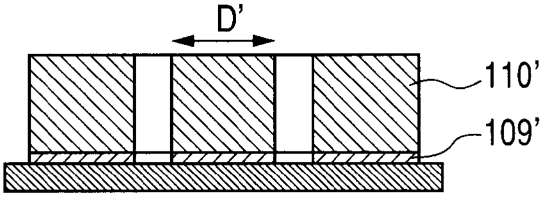

Next, as illustrated in FIG. 3C, the regions of the lower layer resist material and the upper layer resist material which have been irradiated with the exposure light 112 are developed by a removal solution, and a stacked structure of a first resist layer 109' and a second resist layer 110' is formed. That is, the lower layer resist material and the upper layer resist material are patterned so as to leave at least the portions corresponding to the formation positions of the discharge port, and a stacked structure including a first resist layer and a second resist layer is formed.

In the following, the first resist layer is also referred to as a lower layer resist, and the second resist layer is also referred to as an upper layer resist.

At this time, for example, methyl isobutyl ketone, cyclohexanone, or the like can be used as the removal solution in a case where the resist is a solvent-developed positive resist, and for example, a TMAM solution of 2 to 10% or the like can be used as the removal solution in a case where the resist is an alkali-developed positive resist.

In addition, the first resist layer becomes the first resist layer for forming the tip portions of the discharge ports. Additionally, in the discharge port forming member manufactured in the present embodiment, the tip portions of the discharge ports have a meniscus structure.

In the present embodiment, for example, the width D' (refer to FIG. 3C) of the lower layer resist 109' and the upper layer resist 110' which have been left can be set to 14 μm.

Figure 3D:
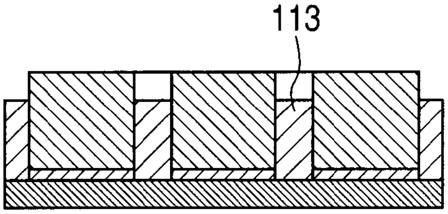

Next, as illustrated in FIG. 3D, the first plating treatment is performed to form the first plated layer 113 on the portion of the conductive substrate exposed by removing the lower layer resist material and the upper layer resist material. At this time, the first plating treatment is performed so that the top surface of the first plated layer 113 is located above the top surface of the lower layer resist 109' and located below the top surface of the upper layer resist 110'.

As the plating material, i.e., the material of the discharge port forming member, for example, Ni can be used. Additionally, Pd, Cu, or Au, or composite materials thereof can be used in addition to Ni. In addition to these, for example, materials, such as Ti, Zr, Hf, V, Cr, Mo, W, Mn, Tc, Re, Fe, Co, Ni, Ru, Os, Rh, Ir, Pt, Ag, Au, Ge, $SiO_2$, $Si_3N_4$, $Al_2O_2$, and BeO, may be selected. Additionally, resin components, such as Teflon, can be co-deposited into the respective metals.

As the plating treatment, for example, electrolytic plating or electroless plating can be performed. For example, a thin film of Pd or Ni is formed on a glass substrate by the sputtering method to fabricate a conductive substrate. Thereafter, $SiO_2$ which becomes the first resist layer is formed by the sputtering method. The conductive substrate is used as a workpiece, and a Ni electroplating substance is made to grow on the conductive substrate by performing electroplating using a nickel sulfamate bath with the conductive substrate as a cathode. At this time, pH in the bath is 3 to 5, the bath temperature is 40 to 60° C., and the cathode current density is 2 to 50 A/dm$^2$.

In the present embodiment, for example, the thickness t of the first plated layer can be set to 10 μm.

Figure 3E:
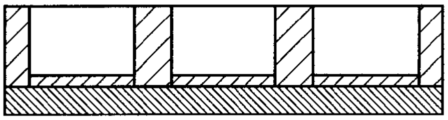

Next, as illustrated in FIG. 3E, the upper layer resist 110' is removed.

At this time, as the method of removing the upper resist 110', a method using a dissolution solution which does not dissolve the first resist layer but dissolves the second resist layer can be used. In the upper layer resist and lower layer resist, there are a method of using differences in photosensitive wavelength or a method of performing development with different developers, specifically, a method of using an alkali-developed material and a solvent-developed material.

Figure 3F:
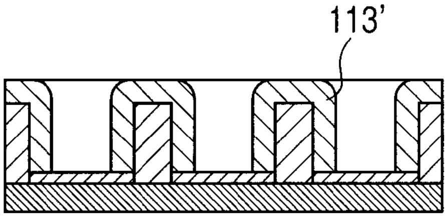

Next, as illustrated in FIG. 3F, the second plating treatment is performed to form a second plated layer 113' around the first plated layer 113 and form the discharge port forming member 105.

The second plating treatment is performed, for example, by performing electroplating using a Ni electroplating bath with the first plated layer as a cathode, whereby a plating substance can be further made to grow on the first plated layer isotropically, forming a discharge port forming member.

In the present embodiment, for example, a discharge port diameter d' can be set to be 10 μm by making a plating substance grow on the first plated layer isotropically only to a thickness of 2 μm. Additionally, in the present embodiment, the thickness T of the discharge port forming member can be set to 12 μm.

Figure 3G:
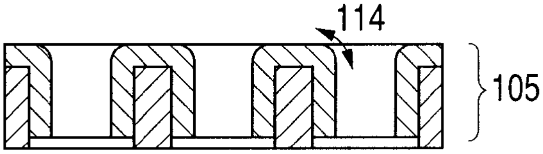
Figure 4A:
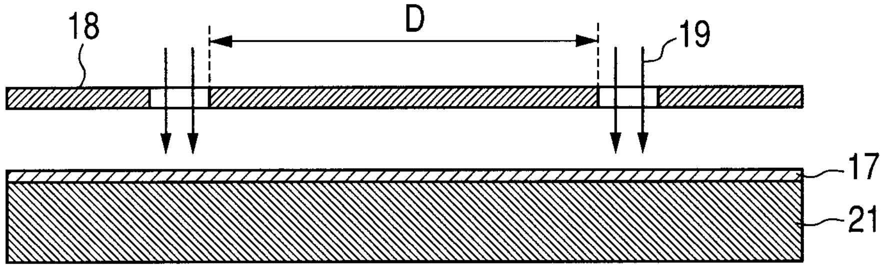
FIGS. 4A, 4B and 4C are process sectional views for describing a forming process flow of a conventional discharge port forming member.
Figure 4B:
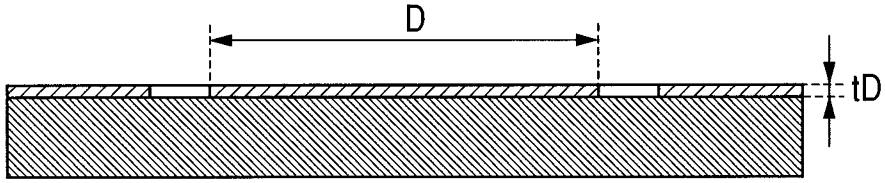
Figure 4C:
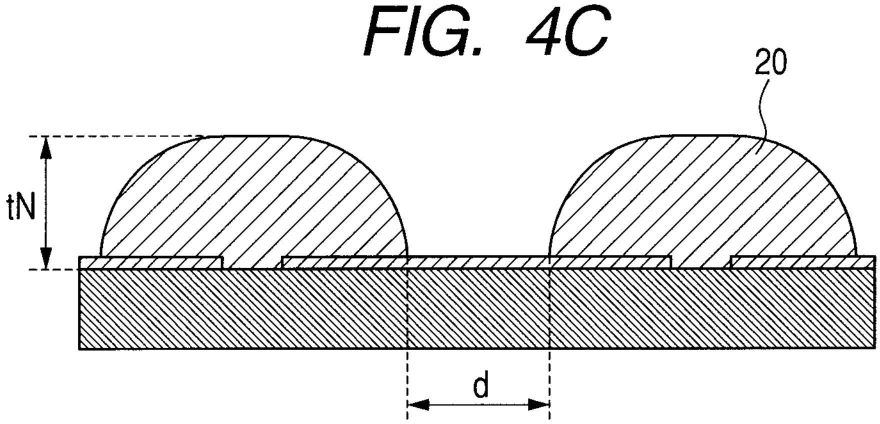

Next, as illustrated in FIG. 3G, the lower layer resist 109' is removed, and the discharge port forming member 105 is removed from the conductive substrate 108.

In addition, the discharge port diameter d' of the discharge port forming member can be expressed by the following expression.

$$d' \cong D' - 2(T - t) \quad \text{(Expression 2)}$$

The discharge port forming member 105 manufactured by the method of the present invention, as illustrated in FIG. 3G, has a shape which does not have an edge at a curved portion 114. Additionally, even if the density of the nozzles is an extremely high density, the required thickness of a discharge port forming member can be guaranteed. Accordingly, a liquid discharge head obtained by bonding the discharge port forming member 105 to the flow path walls 103 has a significantly excellent discharge performance since discharged ink droplets become dots which have substantial straight-ahead power.

Embodiment 2

Figure 6:
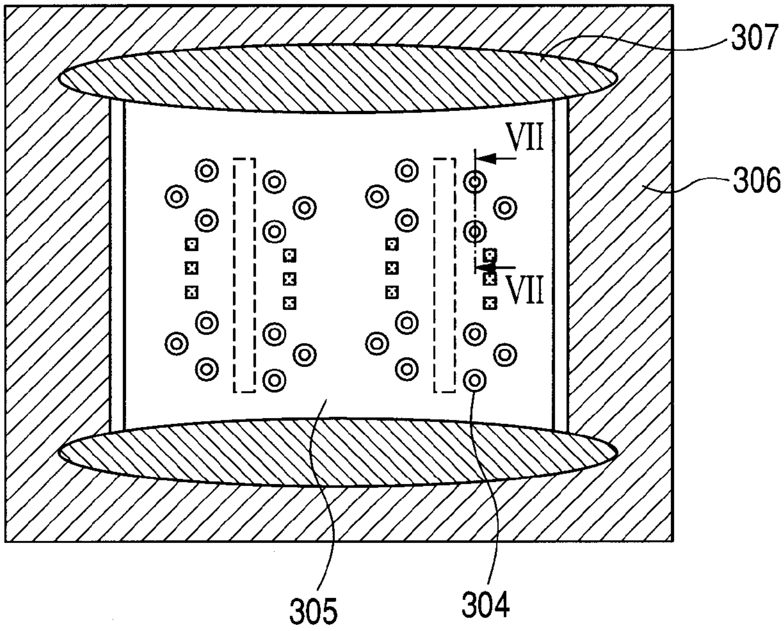
FIG. 6 is a schematic view illustrating a configuration example of a discharge port forming member manufactured in the present embodiment.
Figure 7:
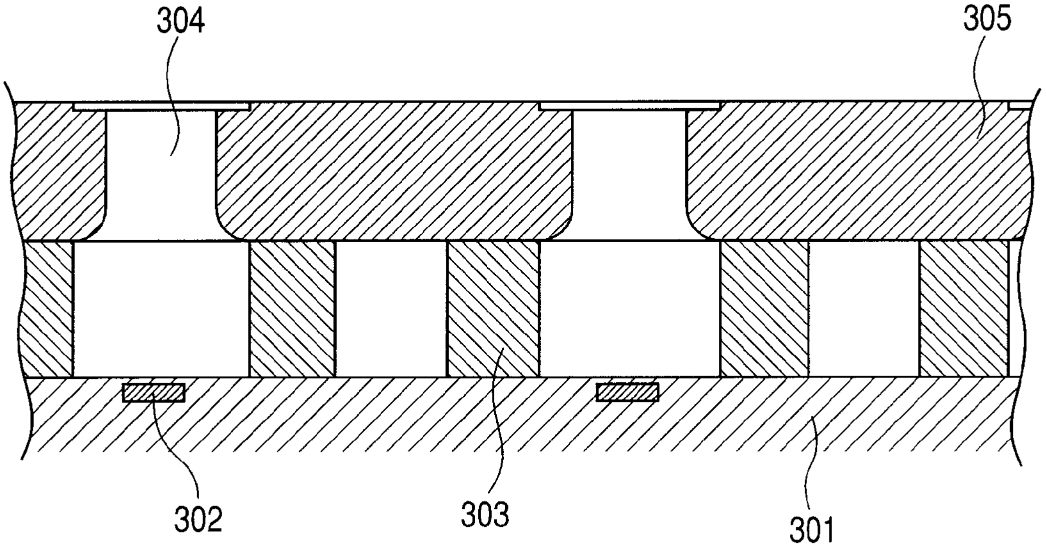
FIG. 7 is a sectional schematic view in a line VII-VII of FIG. 6 illustrating a configuration example of a liquid discharge head which has a discharge port forming member manufactured in the present embodiment.

Additionally, schematic views of a liquid discharge head having a discharge port forming member in a case where discharge ports are arranged in a staggered fashion are illustrated in FIGS. 6 and 7. For example, the pitch between nozzles is set to 1200 dpi in the present embodiment.

At this time, since the discharge ports are arranged in a staggered fashion, the pitch between the discharge ports becomes 600 dpi. However, a different row of ink flow path (liquid flow path) in the staggered arrangement exists between adjacent discharge ports. Since the portion of the discharge port forming member, to which the flow path wall 303 and the discharge port forming member 305 are bonded, is formed flatly, the bonding reliability of the flow path walls 303 is extremely high, and there are also no concerns regarding crosstalk or the like.

Embodiment 3

A process of manufacturing a discharge port forming member using an inorganic material in the lower layer resist in Embodiment 1 is illustrated in FIGS. 8A to 8G. In the present embodiment, an aspect where an $SiO_2$ film which is an insulating material is used as the first resist layer is described.

Figure 8A:
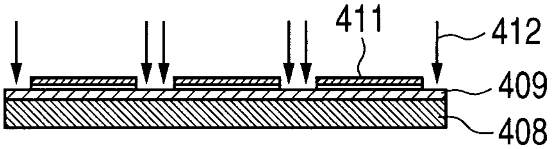
FIGS. 8A 8B, 8C, 8D, 8E, 8F and 8G are process sectional views for describing a process for manufacturing a discharge port forming member of the present embodiment.
Figure 8B:
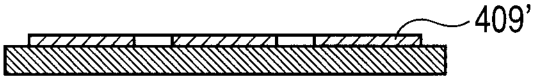

First, as illustrated in FIG. 8A, an $SiO_2$ film 409 which has an insulating property as a fixing member is formed on a conductive substrate 408. Then, a patterning resist 411 is formed as a film and patterned on the $SiO_2$ film 409. Thereafter, the $SiO_2$ film 409 is etched and patterned by etching gas 412. FIG. 8B illustrates a patterned $SiO_2$ film 409'.

As the material of the fixing member, any insulating materials that can be fixed and formed on a conductive substrate can be used, and in addition to $SiO_2$, inorganic materials, such as SiN and SiC, resin materials, such as polyimide resin and epoxy resin, or the like can be exemplified.

Figure 8C:
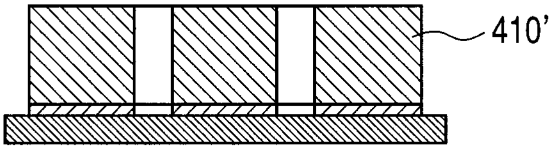

Next, as illustrated in FIG. 8C, a second resist layer 410' is formed on the $SiO_2$ film 409'. At this time, in the present embodiment, the width of the second resist layer 410' is made to be the same as the width of the $SiO_2$ film 409'. That is, the $SiO_2$ film 409' which becomes the first resist layer and the second resist layer have a structure stacked so that side end surfaces thereof are continuous. By stacking the first resist material which becomes the first resist layer and the second resist material which becomes the second resist layer and patterning the two layers collectively to form the first resist layer and the second resist layer, both the resist layers can be made into the same shape, and the positions of the side end surfaces of the layers can be made to coincide with each other. The second resist layer is formed from a resin material.

Figure 8D:
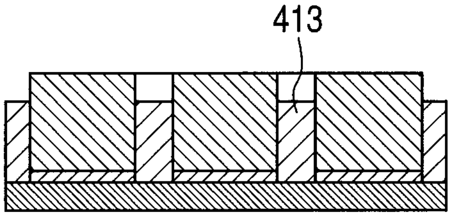

Next, as illustrated in FIG. 8D, the first plating treatment is performed to form a first plated layer 413 on the conductive substrate. At this time, the first plating treatment is performed so that the top surface of the first plated layer 413 is located above the top surface of the $SiO_2$ film 409' and located below the top surface of the second resist layer 410'. For example, plated nickel grows in regions where the second resist layer and the $SiO_2$ film 409' which becomes the first resist layer do not exist, and plating treatment is stopped in regions which are above the top surface of the $SiO_2$ layer 409' and below the top surface of second resist layer 410'.

Figure 8E:
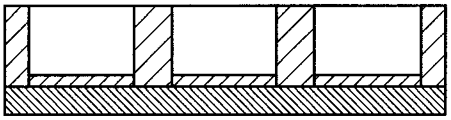

Next, as illustrated in FIG. 8E, only the second resist layer 410' is removed.

Figure 8F:
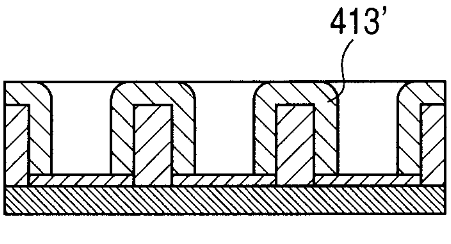

Next, as illustrated in FIG. 8F, the second plating treatment is performed to form a second plated layer 413' around the first plated layer 413 and form the discharge port forming member 405.

Figure 8G:
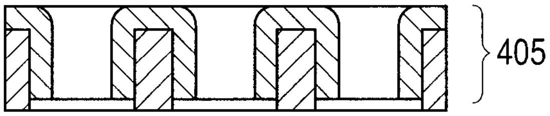

FIG. 8G illustrates a state where the discharge port forming member 405 has been removed from the conductive substrate 408 and the $SiO_2$ film (fixing member) 409'.

The conductive member and the fixing member are strongly bonded together, and can be reused in the manufacturing method of the present invention. When a discharge port forming member is fabricated using this substrate again, it is possible to start from the process of FIG. 8C, and simplification of the process and cost reduction can be achieved.

Embodiment 4

Embodiment 4 of the present invention will be described below.

Figure 9A:
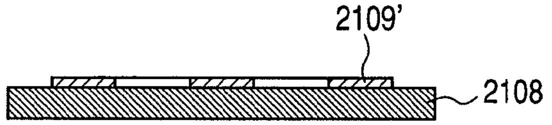
FIGS. 9A, 9B, 9C, 9D, 9E and 9F are process sectional views for describing a process for manufacturing a discharge port forming member of the present embodiment.

FIG. 9A illustrates a state where a lower layer resist 2109' is patterned and formed on a conductive substrate 2108.

Figure 9B:
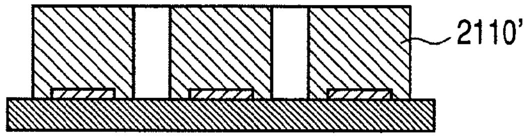

Next, as illustrated in FIG. 9B, an upper layer resist material is applied and patterned on the lower layer resist 2109' to form an upper layer resist 2110'. At this time, the upper layer resist material is patterned so that the upper layer resist covers the top surface and side end surfaces of the lower layer resist.

Figure 9C:
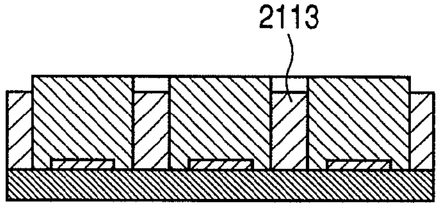

Next, as illustrated in FIG. 9C, a first plated layer 2113 is formed on the conductive substrate 2108. For example, Ni plating is formed in the regions on the conductive substrate 2108 where the resist does not exist.

Figure 9D:
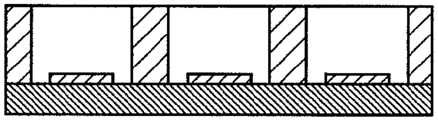

Next, as illustrated in FIG. 9D, the upper layer resist 2110' is removed.

Figure 9E:
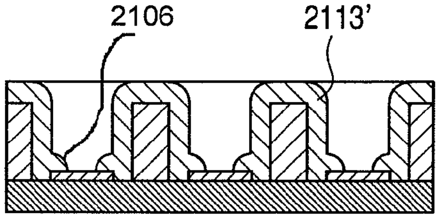

Next, as illustrated in FIG. 9E, the second plating treatment is performed to form a second plated layer 2113' around the first plated layer 2113 and form the discharge port forming member 2105. At this time, projections 2106 are formed on the lower layer resist 2109'.

Figure 9F:
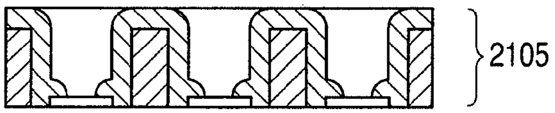

Next, as illustrated in FIG. 9F, the lower layer resist 2109' is removed, and the discharge port forming member 2105 is removed from the conductive substrate 2108.

Figure 10:
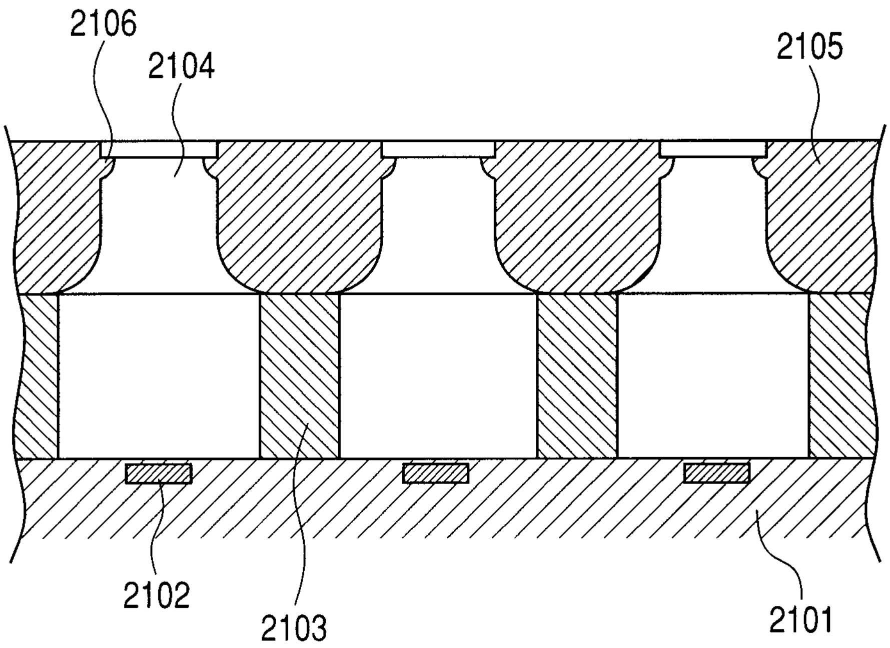
FIG. 10 is a sectional schematic view illustrating a configuration example of a liquid discharge head which has a discharge port forming member manufactured in the present embodiment.
Figure 11:
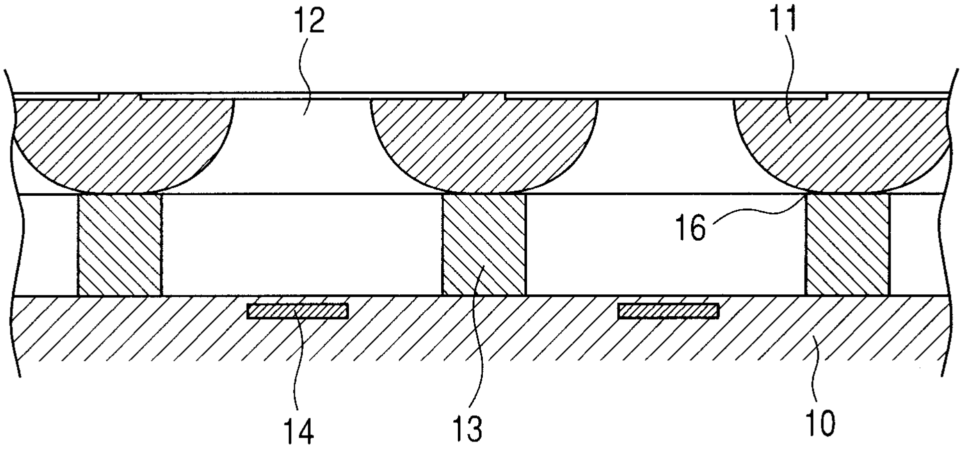
FIG. 11 is a sectional schematic view of a liquid discharge head which has a conventional discharge port forming member.

FIG. 10 illustrates a state where the discharge port forming member 2105 is joined to flow path walls 2103. The flow path walls 2103 are joined to an element substrate 2101. Since the projections 2106 exist in the discharge port forming member 2105, a larger amount of ink exists in the vicinity of the discharge ports 2104 compared to a discharge port forming member which has no projections 2106 near the discharge ports 2104 and has discharge ports of the same discharge port area. Therefore, the liquid components which have evaporated from the surfaces of the discharge ports 2104 can be further replenished from the ink which exists below. Accordingly, drying of the discharge ports which occurs while ink is not discharged is reduced. Accordingly, improvements in discharge efficiency are expected by using the discharge port forming member 2105.

As illustrated in the above embodiments, a so-called meniscus structure can be given to the discharge ports by using the first resist layer.

A structure including the first resist layer and the second resist layer, as illustrated in FIG. 8C, can also be a stacked structure in which surfaces coincide with each other and overlap each other. Additionally, as illustrated in FIG. 9B, a structure can also be adopted in which the shape of the second resist layer is larger than the shape of the first resist layer in the planar direction, and the second resist layer covers the first resist layer. In addition to this, a stacked structure can be adopted in which the shape of the first resist layer is larger than the shape of the second resist layer in the planar direction, and the second resist layer is formed inside a discharge tip molding material. Which structure is selected as the structure including the first resist layer and the second resist layer can be appropriately selected in consideration of desired shapes of the discharge ports.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-268758, filed Nov. 26, 2009, which is hereby incorporated by reference herein in its entirety.

What is claimed is:

1. A method of manufacturing a liquid discharge head having a substrate including energy generating elements which generate energy used to discharge a liquid, and a discharge port member which is provided with discharge ports which discharge the liquid and is joined to the substrate, thereby forming liquid flow paths communicating with the discharge ports, the method comprising, in the following order:

preparing a base having a conductive surface, a first insulating resist and a second insulating resist for forming the discharge ports, the first and second insulating resists being stacked on the conductive surface in the listed order;

performing first plating using the first resist and the second resist as masks so as to form a first plated layer on the conductive surface so that the height of the top surface of the first plated layer from the base is higher than the height of the top surface of the first resist from the base and is lower than the height of the top surface of the second resist from the base;

removing the second resist;

performing second plating on the conductive surface using the first resist as a mask, thereby forming a second plated layer so as to cover the first plated layer;

removing the base and the first resist, thereby forming the discharge port member; and joining together the substrate and the discharge port member.

2. The method of manufacturing a liquid discharge head according to claim 1, wherein the first resist and the second resist are stacked so that side end surfaces of the first resist and the side end surfaces of the second resist are continuous.

3. The method of manufacturing a liquid discharge head according to claim 1, wherein the second resist layer is arranged inside the first resist layer.

4. The method of manufacturing a liquid discharge head according to claim 1, wherein the second resist layer is provided so as to cover side end surfaces and the top surface of the first resist.

5. The method of manufacturing a liquid discharge head according to claim 1, wherein the first resist is made of $SiO_2$.

6. A method of manufacturing a discharge port member used for a liquid discharge head which discharges a liquid and provided with discharge ports, the method comprising in the following order:

preparing a base having a conductive surface, a first insulating resist and a second insulating resist for forming the discharge ports, the first and second insulating resists being stacked on the conductive surface in the listed order;

performing first plating using the first resist and the second resist as masks so as to form a first plated layer on the conductive surface so that the height of the top surface of the first plated layer from the base is higher than the height of the top surface of the first resist from the base and is lower than the height of the top surface of the second resist from the base;

removing the second resist;

performing second plating on the conductive surface using the first resist as a mask, thereby forming a second plated layer so as to cover the first plated layer; and removing the base and the first resist, thereby forming the discharge port member.

7. The method of manufacturing a discharge port member according to claim 6, wherein the first resist and the second resist are stacked so that side end surfaces of the first resist and side end surfaces of the second resist are continuous.

8. The method of manufacturing a discharge port member according to claim 6, wherein the second resist layer is provided so as to be arranged inside the first resist layer.

9. The method of manufacturing a discharge port member according to claim 6, wherein the second resist layer is provided so as to cover side end surfaces and the top surface of the first resist.

10. The method of manufacturing a discharge port member according to claim 6, wherein the first resist is made of $SiO_2$.

* * * * *